J. E. BARNABA.
TICKET HANDLER.
APPLICATION FILED MAR. 21, 1912.

1,028,661.

Patented June 4, 1912.

Witnesses
R. N. Jones.
Harry M. Test.

Inventor
J. E. Barnaba.
By
Attorney

UNITED STATES PATENT OFFICE.

JAMES E. BARNABA, OF DOUGLAS, ILLINOIS.

TICKET-HANDLER.

1,028,661.  Specification of Letters Patent.  Patented June 4, 1912.

Application filed March 21, 1912. Serial No. 685,166.

*To all whom it may concern:*

Be it known that I, JAMES E. BARNABA, a citizen of the United States, residing at Douglas, in the county of Knox, State of Illinois, have invented certain new and useful Improvements in Ticket-Handlers; and I do hereby declare the following to be a full, clear, and exact description of the invention, such as will enable others skilled in the art to which it appertains to make and use the same.

This invention relates to improvements in ticket handlers.

The principal object of the invention is to provide a simple device for passing a weight ticket from the office to the driver at a grain elevator, coal yard, or other place where material is weighed in the wagon.

Another object is to so construct and arrange the device that the weight ticket may be passed out to the driver from the office without necessitating the clerk leaving the office, or opening the door.

Other objects and advantages will be apparent from the following description and with particular reference to the accompanying drawings.

Figure 1:
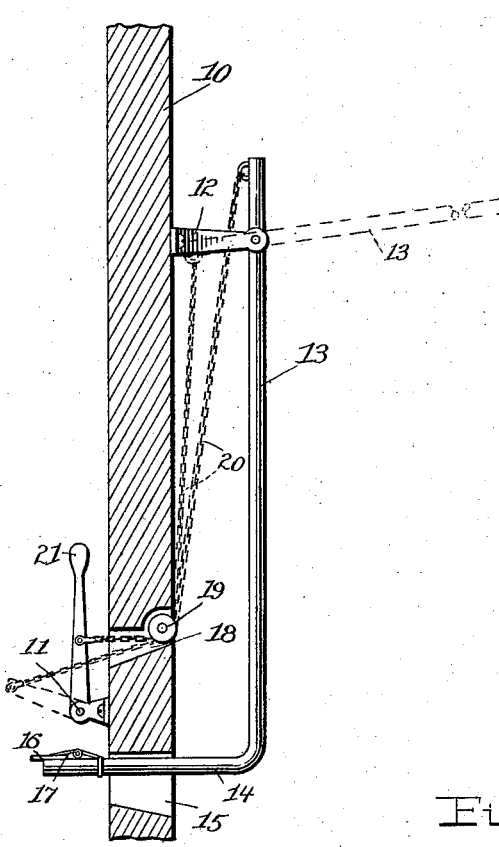
Figure 2:
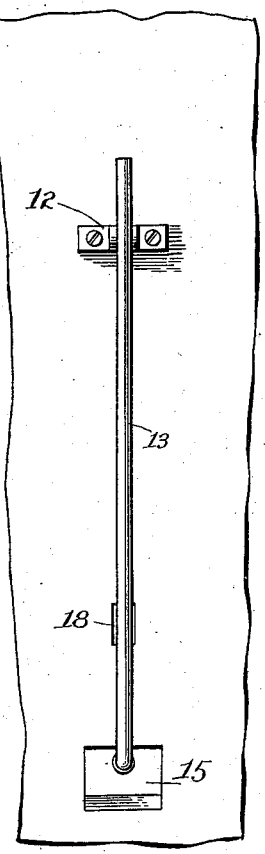
Figure 3:
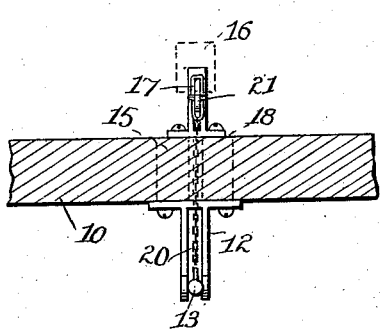

In the drawings: Figure 1 is an elevation of the device in position to receive the ticket, the wall of the office which supports the device being shown in section, Fig. 2 is a view of the device looking from the right in Fig. 1, and Fig. 3 is a top plan view.

Referring particularly to the drawings, 10 represents the outer wall of an office, of a coal yard or grain elevator, the weighing scales being located on the outside as indicated, and on which the wagon is driven with the load to be weighed. Pivotally mounted on the outside of the wall 10 on the bracket 12 is an arm 13 having its free end at right angles, as indicated at 14, and adapted when the lever is in downward position, as shown in Fig. 1, to enter an opening 15, in the wall, so that said angular portion will project into the office. On this angular projection is arranged a spring clip 17, under which the clerk in the office will slip the ticket 16 showing the weight of the load. Above the opening 15 is another opening 18, and within this opening is mounted a grooved wheel 19 under which passes a chain 20. One end of the chain is located within the office, and has thereon a hand grip 21 pivoted at 11 while the opposite end of the chain extends upwardly along the wall and is attached to the pivoted end of the arm 13.

In the use of the device, a wagon having a load to be weighed is driven onto the scales, the clerk inside the office taking note of the weight, and then making out a ticket showing the gross and tare weights. The arm 13 being indicated in the position indicated in full lines in Fig. 1, the clerk then slips the ticket under the clip on the arm, and grasps the handle of the chain and pulls on the same, which causes the arm to swing upwardly, as indicated in dotted lines in Fig. 1, the outer end of the arm holding the ticket, being presented within convenient reach of the driver, without necessitating the the driver getting down from his seat. It will also be noted that this also obviates the necessity of the clerk leaving the office, or even opening the door to hand the ticket out.

From the foregoing it will be seen that the device is very simple, and can be manufactured at a comparatively low cost, and greatly facilitates the passage of a ticket, from the office to the drivers without the necessity of the clerk leaving the office.

What is claimed is:

A ticket handler comprising a swinging arm pivotally mounted on the outer face of a wall of a building, said wall having a pair of vertically alined openings, angular extensions on the free end of the arm for projecting through the lower end of the said opening, a spring clip on the extension, a chain secured at the opposite end of the arm, and passing through the upper of the said openings, and a handle on the chain, located on the inner side of the wall, whereby when a ticket is placed under the clip, and the chain pulled, the arm will be swung up to present the ticket within convenient reach of the driver of a wagon.

In testimony whereof, I affix my signature, in presence of two witnesses.

JAMES E. BARNABA.

Witnesses:
 JAMES DONALDSON,
 C. D. BRIGGS.